R. W. HUBBARD.
BRACKET.
APPLICATION FILED AUG. 3, 1908.
921,704.
Patented May 18, 1909.
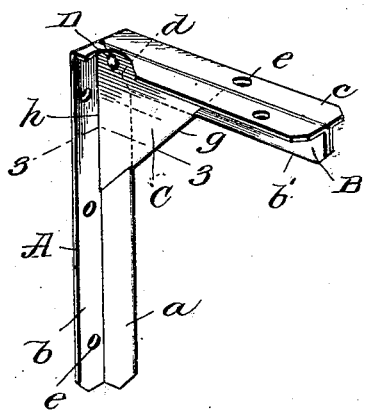
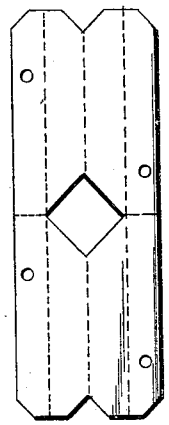
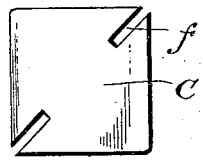
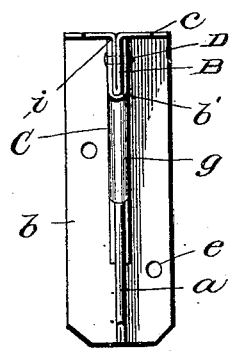
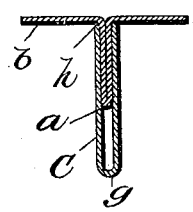
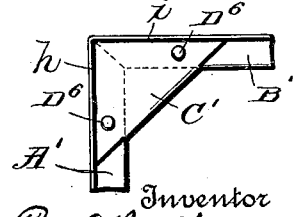
Witnesses
Inventor
R. W. Hubbard
by James Shuhy
Attorney

UNITED STATES PATENT OFFICE.

RICHARD W. HUBBARD, OF ASHTABULA, OHIO.

BRACKET.

No. 921,704.  Specification of Letters Patent.  Patented May 18, 1909.

Application filed August 3, 1908.  Serial No. 446,708.

*To all whom it may concern:*

Be it known that I, RICHARD W. HUBBARD, citizen of the United States, residing at Ashtabula, in the county of Ashtabula and State of Ohio, have invented new and useful Improvements in Brackets, of which the following is a specification.

My invention relates to brackets such as are made of sheet-metal and are constructed with a view of securing the requisite stiffness and strength to support loaded shelves and the like, and the object of the invention is the provision in combination with the upright member and the horizontal member of a bracket, of a brace which occupies a corner of the space between the said members and serves not only to maintain the horizontal member in its normal position, but also to increase the thickness of the strengthening ribs on the horizontal and vertical members and in that way increase the strength and supporting capacity of the bracket as a whole.

With the foregoing in mind the invention will be fully understood from the following description and claim when the same are read in connection with the drawings, accompanying and forming part of this specification, in which:

Figure 1 is a perspective view of a metal bracket constructed in accordance with my invention. Fig. 2 is a front elevation of the same. Fig. 3 is a section taken in the plane indicated by the line 3—3 of Fig. 1 and illustrating the arrangement of my novel brace relative to the rib on the upright member. Fig. 4 is a view of the blank of sheet-metal of which the upright member and the horizontal member of the bracket are formed. Fig. 5 is a view of the sheet-metal blank of which my novel brace is formed, and: Fig. 6 is a detail side elevation illustrative of a modified mode of fixing my novel brace with respect to the upright member and the horizontal member of the bracket.

Similar letters designate corresponding parts in all of the views of the drawings, referring to which:

A is the upright member, and B is the horizontal member of my novel bracket. These members are preferably formed of a blank such as shown in Fig. 4, and by reference to Figs. 1 to 3 it will be noticed that the upright member A has a vertical central strengthening rib $a$, of loop form in cross-section, and flanges $b$ extending in opposite directions from said rib, and that the member B has a similar rib $b'$ and flanges $c$ extending in opposite directions therefrom; also, that a miter joint $d$ is formed between the meeting portions of the rib $a$ and the rib $b'$, whereby the member B is enabled to rest at a right angle to the member A notwithstanding it is formed integral with said member A. The flanges $b$ of the member A and the flanges $c$ of the member B are provided with a suitable number of apertures $e$ for the passage of screws, nails or other attaching devices which I have deemed it unnecessary to illustrate.

C is my novel brace for assisting in the support of the member B and lending additional strength to both the member B and the member A. The said brace C is formed of a single piece of rectangular form, and the piece, which is of sheet-metal, is provided with kerfs $f$ which extend inward from opposite corners of the piece toward the center of the same. Thus it will be manifest that when the piece is bent into U-shape in cross-section, Fig. 3, recesses will be afforded therein of a length to receive the ribs $a$ and $b'$ throughout the width of said ribs. It will also be manifest that the brace will be provided with a straight bight $g$, of a length to extend directly between the edge of the rib $a$ and the edge of the rib $b'$, and will also be provided with edges $h$ and $i$ designed to bear throughout their length against the member flanges $b$ and $c$, respectively. Any suitable means may be employed for securing the brace C in position, such for instance as the single transverse rivet D extending through the brace and between the meeting ends of the ribs $a$ and $b$, as shown in Fig. 1, or the two rivets $D^6$ shown in Fig. 6, which rivets $D^6$ extend through the brace $C'$ and the ribs of the members $A'$ and $B'$.

By virtue of the interposition of the straight bight $g$ of the triangular brace between the adjacent edges of the ribs on the bracket members, it will be observed that the brace is enabled to strongly support the upper member in a horizontal position, and by virtue of the brace being triangular in form it will be observed that it fully occupies the corner of the space between the flanges on the bracket members and serves to support the flanges on the upper member from the flanges on the upright member, and at the same time increases the thickness and consequently the strength of the portions of the ribs which it straddles.

Notwithstanding the practical advantages of my novel triangular brace as described, it will be understood that inasmuch as the said brace may be quickly and easily produced from a small piece of metal, it adds but little to the cost of producing the bracket as a whole.

Having described my invention, what I claim and desire to secure by Letters-Patent, is:

A sheet-metal bracket comprising an upright member having a vertical central rib and flanges extending therefrom, a horizontal member fixed with respect to the vertical member and having a longitudinal central rib and flanges extending therefrom, and a triangular brace, of U-shape in cross-section, straddling the ribs on the members and fully occupying the corner of the space between the members and the flanges thereof, and having a straight bight extending between the adjacent edges of the ribs on the members and also having edges bearing against the adjacent sides of the flanges on the members; the said triangular brace being fixed with respect to the vertical and horizontal members.

In testimony whereof I have hereunto set my hand in presence of two subscribing witnesses.

RICHARD W. HUBBARD.

Witnesses:
  E. C. HUBBARD,
  M. E. KNERINGER.